Patented Feb. 18, 1936

2,031,243

UNITED STATES PATENT OFFICE 2,031,243

TREATMENT OF ORGANIC CELLULAR MATERIALS

Eduard Julius Wolf, Hamburg, Germany

No Drawing. Application July 21, 1933, Serial No. 681,665. In Germany December 27, 1930

12 Claims. (Cl. 99—11)

This application is in part a continuation of my copending application Ser. No. 582,643, filed on 22nd of December 1931, in which the salt mixtures described herein are claimed. Said prior application has now become Patent No. 1,998,179.

The requirements in salts for the functioning of the living cell are known. It is known, that pure salt solutions as inorganic media for cells leads to abnormal conditions as, for example, an increased or reduced permeability of the cell membrane, an alteration of the normal osmotic inner pressure of the cells, electrolytic precipitation of suspension colloids, precipitation, alteration of viscosity, alteration of the surface tension, and swelling and contracting of hydrophylic colloids and the like.

Since time immemorial common salt has been used for the dressing of food. In addition, the housewife sometimes employs sodium bicarbonate for the final cooking of certain of the leguminous vegetables. The common salt acts as a liquefier by solution of the colloids. It is probably most frequently regarded only as an indispensible flavouring material. The sodium bicarbonate softens the cooking water chemically in that it precipitates the calcium salts. In this manner the flocculation of the proteins contained in the leguminous products is avoided.

It is now, however, also known that the sodium chloride brings about a far reaching alteration of the organic substances. In the cooking of vegetables as, for example, beans, the plant cells are in the course of the action permeable, so that the salt solution penetrates therein and the constituents of the cell contents diffuse outwardly. The organic products treated with pure salt solutions lose their colour and suffer in flavour and aroma and alter their consistency due to the proteolytic properties of the sodium cations. Meat preserved with salt or vegetables such as beans and the like covered with brine are toughened, lose their fresh taste and their appearance in considerable degree. These facts are already well known, but it was not hitherto known how these difficulties could be overcome. It has already been endeavoured to overcome the unsatisfactory action of pure common salt for example of sodium chloride solution, by adjusting its concentration to correspond with the osmotic pressure in the cell. The physiological common salt solution with about 0.9% sodium chloride is an example of this. However it was in .ediately noted that the isotonic common salt solution interfered with the functioning of the cell in considerable degree. Further knowledge led to the production of Ringer's solution which as known maintains better functioning of the cell for a longer period.

Ringer's solution consists of about 0.95% NaCl, 0.02% KCl. 0.02% CaCl₂ and 0.01–0.1% NaHCO₃. The concentration of this solution is, as also in the case of physiological common salt solution, about 1.0%. Also this solution is adjusted to the osmotic pressure.

According to the present invention it has now been found that salt mixtures can be produced in which the deleterious effects upon the cellular structure of organic materials of the several cations present counteract one another and for this purpose the mixture comprises the cations sodium, potassium or rubidium, magnesium and calcium, strontium or barium. A salt mixture of this character in which the cations are so proportioned that the solution does not alter appreciably the surface tension of an electronegative suspension colloid such as a lipoid will be found to produce no deleterious effect in organic cellular structures such as have been described in the foregoing.

The measurement of the surface tension of the colloid which is to be used as a criterion of the correct proportioning of the cations can be readily carried out in known manner, the lipoid solution used containing for example cholesterin, lecithin and the like.

It has appeared that, for example, a salt mixture of the following composition (with respect to the metal portion) shows the requirements according to the invention to the optimum degree.

100 _____ Sodium ions
5 _____ Postassium ions
2.5 _____ Calcium ions
2.5 _____ Magnesium ions The proportion of sodium ions to the sum of the other cations of which the calcium can (for some uses) be replaced by strontium or barium and the potassium by rubidium, is preferably maintained in the ratio of 100:10.

A departure from these proportions is possible in certain cases, the result, however, being less favourable. On this assumption the ratio between sodium ions and the sum of the other cations can vary from 100:5 to 100:20.

The cations potassium, calcium and magnesium are preferably in the proportion of about 2:1:1.

As opposed to the known physiological salt solutions, the salt mixture according to the invention is not bound by the limits of osmotic equilibrium with the living substance. Whereas all known physiological salt solutions have a salt concentration of about 0.6% to about 1%, for the new salt mixture a different zone of action exists with reference to the concentration to be employed. Thus, for example, with the treatment of foodstuffs with a salt solution containing a high concentration of a salt mixture of the kind described, for example above 10% up to saturated solution no alteration of the colloidal dispersion of the organic substances is brought about. The dispersion phase of the cell also remains unaffected.

The salt mixtures can be produced by mixture of the constituents. The surprising thing is that the mixture does not merely show a combined action of the individual components, but that the action of the individual constituents is partly stopped, while a product with wholly different properties is obtained.

Whereas pure sodium chloride acts in a proteolytic manner and potassium chloride loosens the skin plasma by swelling, the mixture does not show any increased diffusion but, in contradistinction, the cellular structure of the material treated is not adversely affected, so that the salt mixture may be defined as having a practically complete compensated cation action.

The salt mixture according to the invention is suitable for therapeutic and biological purposes, when it is a question of utilizing salt treatment and avoiding deterioration of cell structure. It is moreover applicable in other directions in technology.

While pure salt solutions render cells permeable for salts and the like and causes a diffusion of the liquefied contents, these disadvantages are avoided with the treatment using solutions of the new salt mixture. With the absence of these diffusion and swelling phenomena as well as of effect upon colloids with the use of the salt mixture, none of the disadvantages arise which appear in treatment with pure salt solutions. If vegetables for example are cooked with a solution containing the new salt mixture, they retain a natural colour and preserve also their taste and their fresh flavour and undergo no alteration in their consistency, and moreover, they are not pulped.

The salt mixture according to the invention can be employed also in the household and in vegetable preserving industry in considerable extent and shows, as compared with hitherto employed processes, considerable technical advantages; among others the period of cooking is shortened. As the taste of the salt mixture is not to be distinguished from common salt it serves at the same time as flavouring for the food.

The invention is also suitable for the pickling of meat and the preserving of fish. The juice of the meat is not extracted, it retains its properties and preserves its flavour and consistency whereas the known pickled meat is pale coloured, tough and of unnatural flavour.

If frozen meat is thawed in an aqueous solution of the new salt mixture then the undesired bleeding of the meat juices is avoided. The same applies to the preservation of fish and the thawing of frozen fish.

The invention, however, is not only suitable for the household or the food industry. The salt mixture can also be employed with advantage in the fermenting industry, in tanning, in the textile industry and in all other industries in which it is a question of the treatment of animal or vegetable cells without deterioration thereof.

A suitable salt mixture according to the invention is, for example, composed as follows:

| | Grams |
|---|---|
| NaCl | 86.81 |
| KCl | 5.54 |
| MgCl₂ | 3.53 |
| CaCl₂ | 4.10 |

A salt mixture composed according to this example is hygroscopic, so that it cannot be kept in the solid condition for a long period while exposed to the air, and is preferably employed immediately after admixture of the components. The hygroscopic character can, however, be overcome if in place of the halides of calcium and magnesium, organic salts of both these metals and, if desired, of the other metals present (such as potassium) are employed. A non-hygroscopic salt mixture according to the invention can be prepared, for example, having the following composition:

| | Grams |
|---|---|
| Sodium chloride | 74.55 |
| Potassium tartrate | 7.47 |
| Magnesium lactate | 8.15 |
| Calcium lactate | 9.78 |

It is a surprising fact that the non-hygroscopic salt mixture according to the example shows the same compensation and the same action as the hygroscopic salt mixture when by varying the remaining ions the balance as regards the colloidal chemical cation action is obtained.

In the use of non-hygroscopic potassium, magnesium and calcium salts of organic acids, it will be seen that the ratio of chlorid ion to organic acid ion, will be between 100:5 and 100:20 and preferably is maintained at about 100:10.

In particular the surprising fact has appeared that the salt mixture according to the invention shows a better and stronger flavouring action than is obtained with the same quantity of common salt.

The following examples will serve to illustrate certain modes of application of the salt mixtures according to the present application.

1. 200 g. spinach are cooked in 1 litre of water with an addition of 30 g. of a salt mixture according to the invention having the following composition:

| | Grams |
|---|---|
| NaCl | 74.55 |
| Potassium tartrate | 7.47 |
| Magnesium lactate | 8.15 |
| Calcium lactate | 9.78 |

The spinach is sufficiently boiled in the usual manner and it is observed that it has kept its natural green colour and that the aqueous solution remains practically uncoloured. If, on the other hand, the spinach is boiled in water with the same quantity of sodium chloride the juice (i. e. pot liquor) becomes dark green.

From this example it follows that the solution containing the salt mixture according to the invention does not affect the cell structure of vegetables and does not act upon the content of such cells such as proteins, colouring matters etc.

2. 0.4 g. gelatine in a test tube of an inner diameter of 10 mm. are soaked in 15 ccm. of a salt solution according to this invention consisting of:

| | Grams |
|---|---|
| NaCl | 74.55 |
| Potassium tartrate | 7.47 |
| Magnesium lactate | 8.15 |
| Calcium lactate | 9.78 |

This mixture is dissolved to form a 10% aqueous solution. The height of the gelatine immediately at the beginning of the treatment is 125 mm. After the gelatine has been left to swell for 24 hours, its height is 166 mm. from which is seen that the gelatine has swollen or expanded to the extent of 41 mm. i. e. about 33%. If however gelatine is left to swell in a 10% aqueous solution of NaCl, the amount of swelling under the same conditions is only about 8 to 12%. From these facts it becomes evident that the salt solution according to this invention practically does not act upon the structure of gelatine, while a common salt solution has a detrimental effect upon the gelatine.

3. A ham pickled with a lye of

|  | Grams |
|---|---|
| NaCl | 347.25 |
| KCl | 22.16 |
| MgCl₂ | 14.14 |
| CaCl₂ | 16.45 | dissolved in 20 litres of water shows a natural fresh colour, while ham pickled in a common salt lye in usual manner acquires a dark colour and a harder consistency because the sodium chloride has a hardening effect on the cells. This effect is well known, and thus for pickling ham a solution of pure common salt with potassium nitrate, sulphuric acid etc., added thereto, has heretofore been frequently used. These additions however are undesirable and do not overcome the drawbacks of common salt solutions in a satisfactory manner.

4. The production of mineral yeast may for example be carried out by fermenting together molasses suitably diluted mixed with mineral salts and nitrogenous substances. In this way from 100 kg. molasses about 120 kg. of yeast (the so-called "mineral-yeast") may be obtained. The mineral salts or nutritious salts used comprise potassium phosphate, magnesium sulphate, calcium chloride etc. and to the fermenting liquid about 0.1% of solid salts are usually added.

If, according to the invention, to a mash of 100 kg. molasses, 80 g. ammonium sulphate and 100 g. of a nutritive salt of the above mentioned kind and 1 kg. of the salt mixture according to the invention are added, after sufficient fermentation about 132 kg. of yeast are obtained. It is also observed that the fermentation process is finished in shorter time if a salt solution according to the invention is used, so that for example the fermentation according to the invention is already finished within 8 to 9 hours without aeration whilst under the usual conditions a time of 12 to 14 hours with the introduction of a strong current of air is necessary.

5. For the conservation of skins hitherto a solution of 10 kgs. of sodium chloride and 1 kg. of sulphuric acid in 100 litres of water has been used. It was known that common salt or sulphuric acid (either one alone) is not suitable for this purpose because acids cause a contraction and sodium chloride shows a contrary effect. If according to the invention a solution of 15 kg. of a salt mixture of the following composition:

|  | Grams |
|---|---|
| NaCl | 86.81 |
| KCl | 5.54 |
| MgCl₂ | 3.53 |
| CaCl₂ | 4.10 | in 100 litres of water is used neither a swelling nor a crumpling of the skins is observed and a leather of high quality is obtained by subsequent tonnage.

6. A dye-bath containing 7% indanthren blue GCD, 10 gr. of hydrosulphite and 15 ccm. of caustic soda lye of 40° Bé. are mixed with 25 g. of a salt mixture according to the invention. If in this bath textile fabric is dyed in such a manner that about 30 litres of the dye bath are used for each 1 kg. of the fabric after an hour's treatment at a temperature between 50 and 60° C. and after oxidizing the product, washing it with soap and rinsing it, a darker and more brilliant colour is obtained than was hitherto possible. The fabric has a pliant and soft appearance and a higher lustre and brilliancy than fabrics treated in the usual dye bath of this character.

In the appended claims, "meat" is used in its generic sense to include fish, flesh and fowl.

I claim:—

1. In the treatment of organic cellular materials of animal and vegetable character the step of treating said material with a solution of a salt mixture comprising a sodium salt, a salt selected from the group consisting of potassium and rubidium salts, an alkaline earth salt, and a magnesium salt, in which mixture the sodium salt is in an amount several times greater than the sum of the amounts of said other salts, whereby the cellular structure of the material treated remains substantially unaffected.

2. In the treatment of organic cellular materials, the application thereto of a mixture comprising the salts of sodium, potassium, magnesium and calcium, the cations of the last three of which are respectively present in the approximate proportions of 2:1:1, the ratio of sodium to the sum of the remaining cations being between approximately 100:5 and approximately 100:20.

3. In the treatment of organic cellular materials of animal and vegetable character, the step of applying thereto, a salt mixture containing NaCl as its major constituent, and comprising potassium, calcium and magnesium salts, in which the cations of these last mentioned three salts are present in the approximate ratio 2:1:1.

4. In the treatment of organic cellular materials the step of applying to said material, a salt mixture comprising chlorides and organic acid salts of sodium, potassium, calcium and magnesium, the ratio of chloride ion to organic acid ion being between approximately 100:5 and 100:20, sodium chloride being the major constituent of said mixture.

5. The herein described process which comprises cooking food of the class consisting of vegetable materials and meat in a solution of a salt mixture comprising the salts of sodium, potassium, magnesium and calcium, the cations of the last three of which are respectively present in the approximate proportions of 2:1:1, the proportion of sodium to the remaining cations being approximately from 100:5 to 100:20.

6. Method of preserving meats and vegetables for foodstuffs consisting in mixing such foodstuffs with an aqueous solution of a mixture of salts of sodium, potassium, magnesium and calcium, the cations of the last three of which are respectively present in the approximate proportions of 2:1:1, the proportion of sodium to the remaining cations being approximately from 100:5 to 100:20, and maintaining such material in such solution, for a substantial period, at below cooking temperature.

7. In the art of preserving by refrigeration which consists in subjecting the comestibles under refrigerating conditions, to the action of a physiologically balanced mixture comprising potassium, calcium and magnesium salts, in which the cations of these salts are present in the approximate ratio 2:1:1, in the presence of a preponderating excess of sodium chloride over the other salts.

8. The process of treating meat, fish, vegetables or other comestibles which consists in immersing the comestibles in a non-poisonous bath comprising a salt mixture consisting of salts of sodium, potassium, magnesium and calcium, the cations of the last three of which are respectively present in the approximate proportions of 2:1:1, the proportion of sodium to the sum of remaining cations being approximately from 100:5 to 100:20.

9. Method of cooking organic cellular materials which includes subjecting said organic cellular materials to the action of a solution comprising a physiologically balanced salt mixture, which contains sodium salts with very minor amounts of a salt of another alkali metal, a salt of an alkaline earth metal and a salt of magnesium, while at a cooking temperature.

10. Method of treating organic cellular material which includes immersing such organic cellular material in a non-poisonous solution comprising a physiologically balanced salt mixture, which contains sodium salts with very minor amounts of a salt of another alkali metal, a salt of an alkaline earth metal and a salt of magnesium, and maintaining said material in said solution for a substantial period of time while at a temperature considerably removed from the range of normal room temperature to normal body temperature.

11. In the treatment of organic cellular materials the step of applying to said materials a salt mixture which in solid condition is not hygroscopic and which includes NaCl as the largest component and comprises potassium, magnesium and calcium linked with organic acids such as lactic acid.

12. Method of cooking organic cellular food materials which includes subjecting said organic cellular materials to the action of a hot solution comprising a physiologically balanced salt mixture, said salt mixture comprising NaCl as the major constituent and soluble salts of potassium, magnesium and an alkaline earth metal, including at least one organic acid salt, the molar ratio of NaCl to the sum of the other metal salts being between about 100:5 and about 100:20.

EDUARD JULIUS WOLF.